(12) United States Patent
Yaacobi

(10) Patent No.: US 11,898,485 B2
(45) Date of Patent: Feb. 13, 2024

(54) METHOD AND SYSTEM FOR CONTROLLING THE TEMPERATURE OF AN ENGINE

(71) Applicant: Amnon Yaacobi, Rishon LeZion (IL)

(72) Inventor: Amnon Yaacobi, Rishon LeZion (IL)

(73) Assignee: Amnon Yaacobi, Rishon Le Zion (IL)

( * ) Notice: Subject to any disclaimer, the term of this patent is extended or adjusted under 35 U.S.C. 154(b) by 0 days.

(21) Appl. No.: 17/436,610

(22) PCT Filed: Jun. 25, 2020

(86) PCT No.: PCT/IL2020/050727
§ 371 (c)(1),
(2) Date: Sep. 6, 2021

(87) PCT Pub. No.: WO2021/224903
PCT Pub. Date: Nov. 11, 2021

(65) Prior Publication Data
US 2023/0046144 A1    Feb. 16, 2023

Related U.S. Application Data

(60) Provisional application No. 63/038,853, filed on Jun. 14, 2020.

(30) Foreign Application Priority Data

May 3, 2020   (IL) .......................................... 274416

(51) Int. Cl.
*F01P 1/02* (2006.01)
*F01P 5/08* (2006.01)
(Continued)

(52) U.S. Cl.
CPC .................. *F01P 1/02* (2013.01); *F01P 5/08* (2013.01); *F01P 7/02* (2013.01);
(Continued)

(58) Field of Classification Search
CPC ........ F01P 5/08; F01P 1/02; F01P 7/02; F01P 2001/023; F02B 29/0425
See application file for complete search history.

(56) References Cited

U.S. PATENT DOCUMENTS

| 4,769,092 A | 9/1988 | Peichl et al. |
| 2017/0130639 A1* | 5/2017 | Candela ................... F01P 3/08 |

FOREIGN PATENT DOCUMENTS

| GB | 2521270 | 6/2015 | |
| GB | 2521270 A * | 6/2015 | ............... B60T 5/00 |
| WO | 1998045589 | 10/1998 | |

OTHER PUBLICATIONS

John Deakin, Mixture Magic.
C D Whelan, J M Allport, Active Charge Cooling.

* cited by examiner

*Primary Examiner* — Kevin A Lathers

(57) ABSTRACT

A system for controlling the temperature of an engine, which includes at least one cylinder. The system includes a turbocharger and at least one air-nozzle. The turbocharger includes exhaust-gas-inlet-port, an exhaust-gas-outlet-port, an air-inlet-port, a compressed-air-outlet-port, a turbine and a compressor. The exhaust-gas-inlet-port is coupled with the exhaust-gas-outlet of the engine. Exhaust gas from the engine rotates the turbine, which rotates the compressor. The compressor draws air from the air inlet port, compresses the air thereby increasing the pressure thereof, and provides the compressed air to the compressed-air-outlet-port. An inlet of the air-nozzle or nozzles is coupled with the compressed-air-outlet-port. The air-nozzle or nozzles are directed toward a respective one of the at least one cylinder, and directs a flow of air toward the respective one of the at least one cylinder.

12 Claims, 4 Drawing Sheets

(51) Int. Cl.
*F01P 7/02* (2006.01)
*F02B 29/04* (2006.01)
(52) U.S. Cl.
CPC ..... *F01P 2001/023* (2013.01); *F02B 29/0425* (2013.01); *F02B 29/0437* (2013.01)

METHOD AND SYSTEM FOR CONTROLLING THE TEMPERATURE OF AN ENGINE

FIELD OF THE DISCLOSED TECHNIQUE

The disclosed technique relates to engines in general, and to systems and methods for controlling the temperature of engines in particular.

BACKGROUND OF THE DISCLOSED TECHNIQUE

Controlling the temperature of an internal combustion piston engine, during the operation thereof, has long since been a challenge. Engines may be prone to malfunctions when the cooling agent (i.e., air or liquid) does not properly flow around the cylinders. For example, in airplanes employing an air-cooled piston engine, the Cylinder Head Temperature (CHT) is an important parameter relating to the performance of the engine. Operating the engine at a high CHT may result in high engine ware. For example, high CHTs may cause higher metal fatigue (i.e., relative to low CHTs). Also, air may not flow evenly around all cylinders resulting in different cylinders operating a different CHTs. This may further result in uneven power output from the cylinders. Uneven power output from the cylinders may result in higher ware to the crankshaft (i.e., relative to even power output from the cylinders).

The article entitled "Mixture Magic" to Deakin, reviews how different engine parameters such as mixture, Exhaust Gas Temperature (EGT), CHT, as well as Breaking Horse Power (BHP) and Brake Specific Fuel Consumption (BSFC) relate to each other in a normally aspirated engine. Deakin illustrates that employing a mixture setting just reach of the peak of the EGT, as is sometimes recommended, may result in operating at peak CHT.

Great Britain Patent Application Publication GB2521270 to Kaushik, entitled "Cooling system for a vehicle", directs to a cooling system for cooling a braking device 12 of a vehicle. The system includes a compressor which is a component of an exhaust turbocharger. The cooling system to Kaushik further includes at least one duct element 50 which is fluidically connected to the intake pipe of the engine. The duct element branches off compressed air from the intake pipe 26 and guides the air to the braking device so that the air flowing through the duct element can flow against and/or around at least a portion of the braking device thereby cooling the braking device. The duct element comprises a nozzle which tapers in the direction of flow of the air flowing through the duct element. The nozzle opens into the brake drum.

PCT Patent Application Publication WO1998/045589 to McGibbon, entitled "Exhaust-driven turbine-powered alternator", directs to an alternator, driving by an exhaust gas turbine of a turbocharger, to generate electricity for the vehicle's loads. A controlled bypass gate and passage flanking the turbine can selectively pass a desired portion of the exhaust gas through the turbine.

SUMMARY OF THE PRESENT DISCLOSED TECHNIQUE

It is an object of the disclosed technique to provide a novel method and system for controlling the temperature of an engine. In accordance with the disclosed technique, there is thus provided a system for controlling the temperature of an engine. The engine includes at least one cylinder. The system includes a turbocharger and at least one air nozzle. The turbocharger includes an exhaust gas inlet port, an exhaust gas outlet port, an air inlet port, a compressed air outlet port, a turbine and a compressor. The exhaust gas inlet port is fluidically coupled with the exhaust gas outlet of the engine. An inlet of the at least one air nozzle is fluidically coupled with the compressed air outlet port. Exhaust gas from the engine rotates the turbine. The turbine rotates the compressor. The compressor is configured to draw air from the air inlet port, to compress the air thereby to increase the pressure thereof, and to provide the compressed air to the compressed air outlet port. The at least one air nozzle is directed toward a respective one of the at least one cylinder and configured to direct a flow of air toward the respective one of the at least one cylinder.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for controlling the temperature of an internal combustion engine during the operation thereof, by employing a turbocharger which produce pressurized air, and channeling this pressurized air through an air nozzle or nozzles, toward the outer portion of one or more cylinders (i.e., from without the cylinder). The disclosed technique is configured to be employed with any type of internal combustion engine such as a spark-ignition engine or a diesel engine, operating in either 4-stroke or 2-stroke cycles. The air nozzle or nozzles are, for example, plain orifice nozzles, shaped orifice nozzles, pressure swirl single fluid nozzles, solid cone single fluid nozzles or flat jet nozzles. Also, although the disclosed technique was exemplified by the employment of a turbocharger, the disclosed technique may be implemented with a supercharger. Therefore, the term 'charger' relates herein to either a turbocharger or a supercharger or a twincharger.

Figure 1:
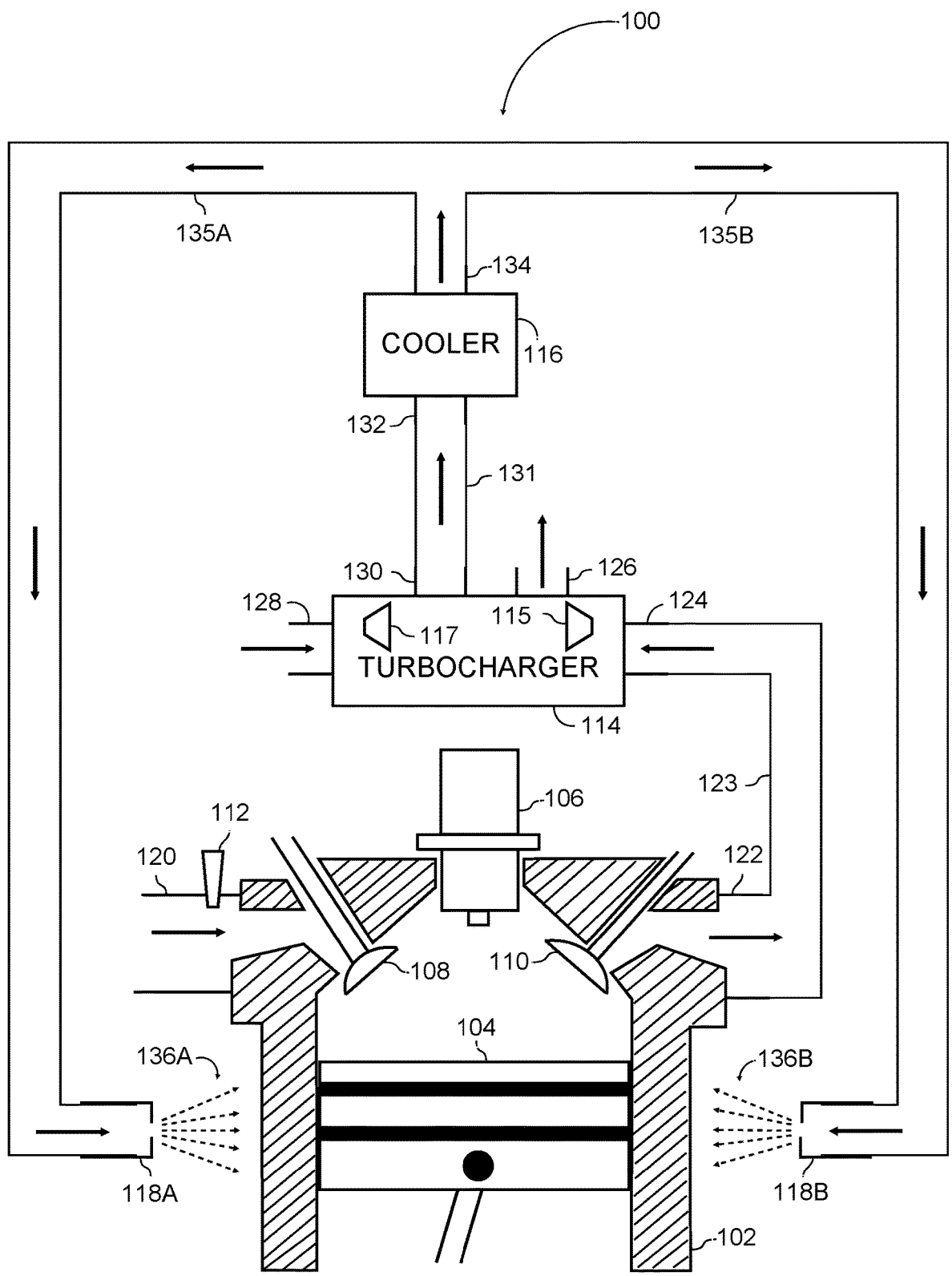
FIG. 1 is a schematic illustration of a system for controlling the temperature of an engine, constructed and operative in accordance with an embodiment of the disclosed technique.

Reference is now made to FIG. 1, which is a schematic illustration of a system, generally referenced 100, for controlling the temperature of an engine, constructed and operative in accordance with an embodiment of the disclosed technique. System 100 includes a turbocharger 114 and air nozzles 118A and 118B. System 100 optionally includes a cooler 116. Turbocharger 114 includes an exhaust gas inlet port 124, an exhaust gas outlet port 126, an air inlet port 128 a compressed air outlet port 130, a turbine 115 and a compressor 117. Cooler 116 includes a cooler intake port 132 and a cooler outlet port 134. Cooler 116 may be a liquid-based or an air-based cooler.

Compressed air outlet port 130 is fluidically coupled (i.e., such that fluid may flow therebetween, for example, by employing one or more pipes or ducts) with the intake of air nozzles 118A and 118B either directly or via cooler 116. When system 100 includes cooler 116, the cooler inlet port 132 is fluidically coupled with compressed air outlet port 130 via duct 131 and the cooler outlet port 134 is fluidically coupled with the inlet of air nozzles 118A and 118B via ducts 135A and 135B respectively. Exhaust gat inlet port 124 is fluidically coupled with the exhaust gas outlet 122 of cylinder 102 via duct 123.

Cylinder 102 includes a piston 104, at least one spark plug 106, at least one intake valve 108, at least one exhaust gas discharge valve 110 and a fuel injector 112. Herein, cylinder 102 is exemplified as a 4-strokes cylinder. During the suction stroke of piston 102, intake valve 108 opens, and air is drawn through the cylinder air intake 120. The drawn air mixes with the fuel injected by fuel injector 112, and enters the cylinder chamber. During the compression stroke, piston 102 rises and compresses the mixture. Thereafter, spark plug 106 ignites the compressed mixture. The ignited mixture expands and push on piston 102 (i.e., the work stroke). Thereafter, exhaust gas discharge valve 110 opens, and as piston 102 rises the exhaust gas in the cylinder chamber are discharged through exhaust gas outlet 122.

Exhaust gas emitted through exhaust gas outlet 122 of cylinder 102 enter turbocharger 114 through exhaust gas inlet port 124. This exhaust gas rotates turbine 115. Turbine 115 rotates compressor 117. Compressor 117 draws air through air inlet port 128, increases the pressure of the air input thereto, and provides the pressurized air through compressed air outlet port 130 to cooler 116. The compressed air passes through cooler 116, where the temperature of this compressed air is reduced. Cooler 116 provides the cooled compressed air to air nozzles 118A and 118B. Air nozzles 118A and 118B discharge a flow of air 136A and 136B respectively toward the outer portion of cylinder 102, thereby cooling cylinder 102. The flow of air discharged by air nozzles 118A and 118B may exhibit a cone shaped pattern, a hollow cone shaped pattern, a solid stream pattern. Also, the density of the air need not be uniform across the pattern.

The temperature of the air discharged from the air nozzles reduces because it expands adiabatically, since there is no heat transferred to or from the air being discharged (i.e., because the process occurs rapidly). Mathematically, let the volume of the air, for example within each of air nozzles 118A and 118B be $V_i$, and the temperature thereof be Ti. After the air is discharged by air nozzles 118A and 118B, the volume thereof is $V_f$ and the temperature thereof is $T_f$. In an adiabatic process $TV^{\gamma-1}$=constant, where $\gamma$ the adiabatic index and is a number bigger than one (e.g., approximately 1.4 for air). Therefore:

$$T_i V_i^{\gamma-1} = T_f V_f^{\gamma-1} \qquad (1)$$

Rearranging equation (1) to get $$T_f = T_i \left(\frac{V_i}{V_f}\right)^{\gamma-1} \qquad (2)$$

Since $V_f > V_i$ (i.e., the volume of the air after it is discharged is larger than the volume of the air in each of air nozzles 118A and 118B), then $T_f < T_i$ (i.e. the temperature of the air after it is discharged is lower than the temperature of the air in the each of air nozzles 118A and 118B). Thus, by directing a flow of air toward cylinder 102, the temperature of cylinder 102 can be controlled. Nevertheless, a humidifier may be added to the system (either before or after turbocharger 114 or as part of cooler 116) to introduce moisture to the compressed air. As the humidified air is discharged through air 118A and 118B the water droplets absorb heat surrounding the cylinder 102 and evaporate, thereby further aiding in cooling cylinder 102.

Figure 2:
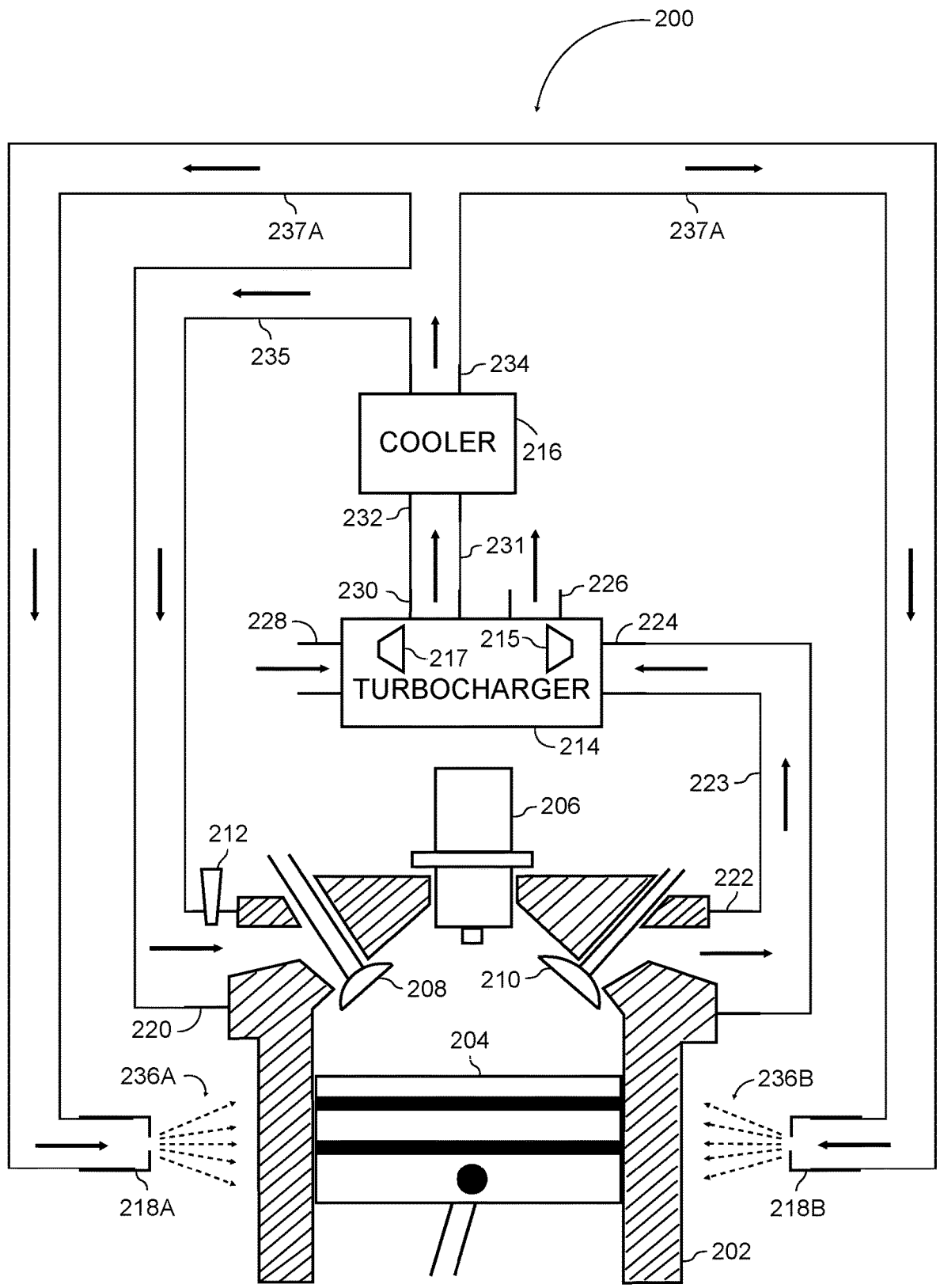
FIG. 2 is a schematic illustration of a system for controlling the temperature of an engine, constructed and operative in accordance with another embodiment of the disclosed technique.

The principles described above in conjunction with FIG. 1 may be employed also when the turbocharger is also employed for increasing the manifold pressure of the engine, as explained below in conjunction with FIG. 2. Reference is now made to FIG. 2, which is a schematic illustration of a system, generally referenced 200, for controlling the temperature of an engine, constructed and operative in accordance with another embodiment of the disclosed technique. System 200 includes a turbocharger 214 and air nozzles 218A and 218B. System 100 optionally includes a cooler 216. Turbocharger 214 includes an exhaust gas inlet port 224, an exhaust gas outlet port 226, an air intake port 228, a compressed air outlet port 230, a turbine 215 and a compressor 217. Cooler 216 includes a cooler inlet port 132 and a cooler outlet port 234. Cooler 216 may be a liquid-based or an air-based cooler. In system 200, turbocharger 214 operates as a conventional turbocharger, increasing the intake air pressure into the cylinder or cylinders (also known as the manifold pressure), as well as for providing pressurized air for controlling the temperature of the cylinders.

Compressed air outlet port 230 is fluidically coupled (i.e., by employing one or more pipes or ducts) with the inlet of air nozzles 218A and 218B and with cylinder air inlet 220 either directly or via cooler 216. When system 200 includes cooler 216, the cooler inlet port 232 of cooler 216 is fluidically coupled via duct 231 with compressed air outlet port 230. Cooler outlet port 234 is fluidically coupled with the inlet of air nozzles 218A and 218B via ducts 237A and 237B respectively. Cooler outlet port 234 is further fluidically coupled with cylinder air inlet 220 via duct 235. Exhaust gat inlet port 224 is fluidically coupled with the exhaust gas outlet 222 of cylinder 202 via duct 223. Cylinder 202 is similar in construction and operation to cylinder 102 (FIG. 1) and includes a piston 204, at least one spark plug 206, at least one intake valve 208, at least one exhaust gas discharge valve 210 and a fuel injector 212.

Exhaust gas emitted through exhaust gas outlet 222 of cylinder 202 enter turbocharger 214 through exhaust gas intake port 224. This exhaust gas rotates turbine 215. Turbine 215 rotates compressor 217. Compressor 217 draws air through air intake port 228, increases the pressure of the air input thereto, and provides the pressurized air through compressed air outlet port 230 to cooler 216. The compressed air passes through cooler 216, where the temperature of this compressed air is reduced. Cooler 216 provides the cooled compressed air to air nozzles 218A and 218B. Air nozzles 218A and 218B discharge a flow of air 236A and 236B respectively toward the outer portion of cylinder 202, thereby cooling cylinder 202. Similar to as described above, the flow of air discharged by air nozzles 218A and 218B may exhibit a cone shaped pattern, a hollow cone shaped pattern, a solid stream pattern and the density of the air need not be uniform across the pattern.

It is noted that a system according to the disclosed technique was exemplified in FIGS. 1 and 2 in the context of a 4-strokes spark-ignition cylinder. In general, the disclosed technique is applicable with any type of internal combustion engine (e.g., a spark-ignition engine or a diesel engine), operating in either 4-stroke or 2-stroke cycles. For the sake of clarity of FIGS. 1 and 2 above, a system according to the disclosed technique was described therein in the context of a single cylinder and two air nozzles. However, the disclosed technique may be implemented on engines including a plurality of cylinders with one or more air nozzles for each cylinder, as exemplified herein below in conjunction with FIGS. 3 and 4. Furthermore, a pressure regulator or regulators may be employed to regulate the air pressure provided to each nozzle or each group of nozzles.

Figure 3:
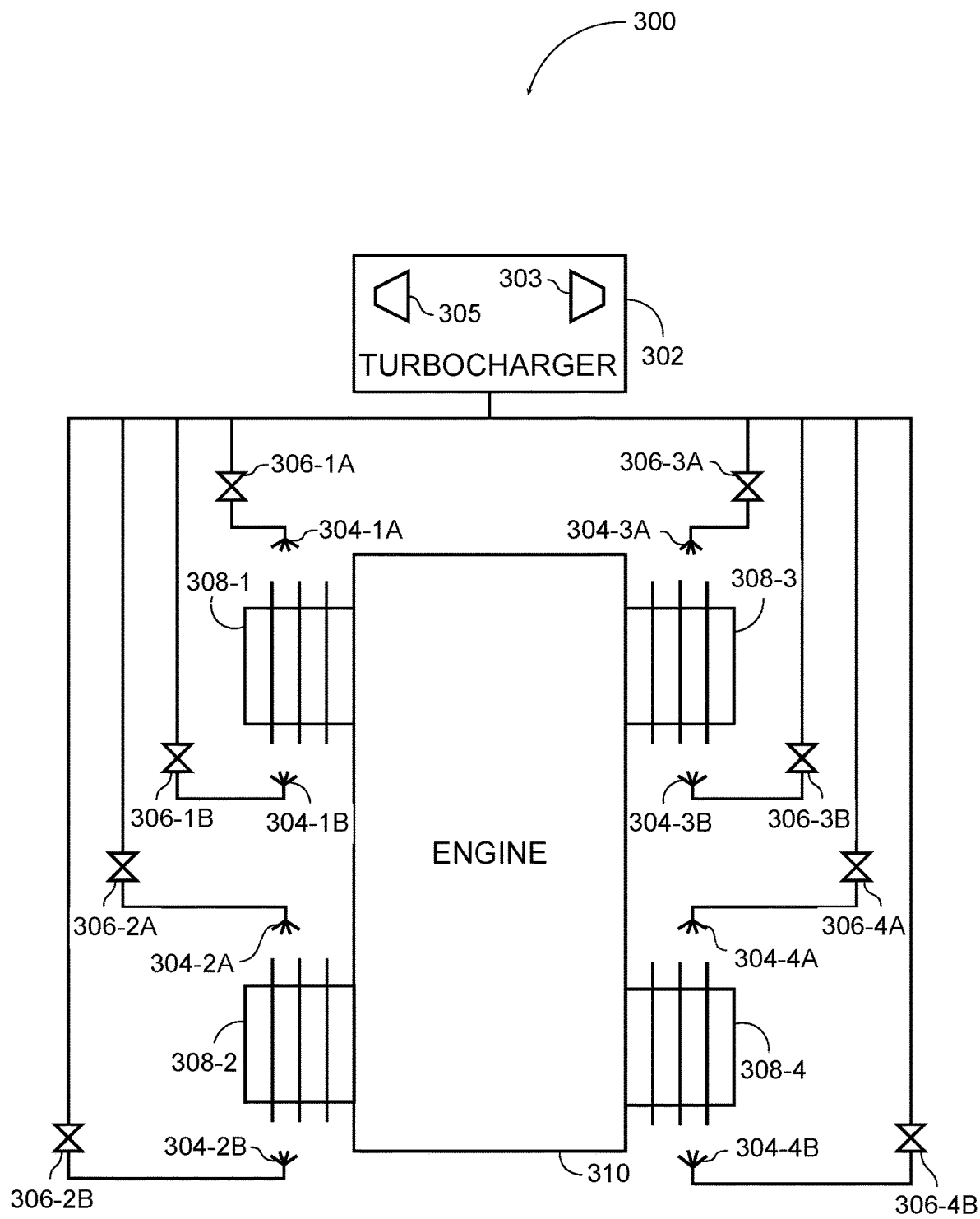
FIG. 3 is a schematic illustration of a system for controlling the temperature of an engine, constructed and operated in accordance with a further embodiment of the disclosed technique.

Reference is now made to FIG. 3, which is a schematic illustration of a system, generally referenced 300, for controlling the temperature of an engine, constructed and operated in accordance with a further embodiment of the disclosed technique. System 300 includes a turbocharger 302 and a plurality of air nozzles, 304-1A, 304-1B, 304-2A, 304-2B, 304-3A, 304-3B, 304-4A and 304-4B. Turbocharger 302 includes a turbine 303 and a compressor 305. Optionally, system 300 includes a plurality of pressure regulators 306-1A, 306-1B, 306-2A, 306-2B, 306-3A, 306-3B, 306-4A and 306-4B.

The inlet of each one of air nozzles 304-1A, 304-1B, 304-2A, 304-2B, 304-3A, 304-3B, 304-4A and 304-4B is fluidically coupled with the compressed air outlet port of turbocharger 302 (i.e., via one or more ducts or pipes). Alternatively, when system 300 includes pressure regulators, the inlet of each one of pressure regulators 306-1A, 306-1B, 306-2A, 306-2B, 306-3A, 306-3B, 306-4A and 306-4B is fluidically coupled with the compressed air outlet port of turbocharger 302. The outlet of each one of pressure regulators 306-1A, 306-1B, 306-2A, 306-2B, 306-3A, 306-3B, 306-4A and 306-4B is fluidically coupled with a respective one of air nozzles 304-1A, 304-1B, 304-2A, 304-2B, 304-3A, 304-3B, 304-4A and 304-4B. It is noted that for the sake of clarity and simplicity of FIG. 3, the coupling of turbocharger 302 with the exhaust gas manifold and with the air intake manifold of engine 310 is omitted.

Each pair of air nozzles 304-1A, 304-1B, 304-2A, 304-2B, 304-3A, 304-3B, 304-4A and 304-4B is directed toward a respective one of cylinder 308-1, 308-2, 308-3 and 308-4 of engine 310. Air nozzles 304-1A and 304-1B are directed toward cylinder 308-1, air nozzles 304-2A and 304-2B are directed toward cylinder 308-2, air nozzles 304-3A and 304-3B are directed toward cylinder 308-3, air nozzles 304-4A and 304-4B are directed toward cylinder 308-4.

Exhaust gas from the exhaust gas manifold of engine 310 rotates turbine 303. Turbine 303 rotates compressor 305. Compressor 305 draws air and increases the pressure thereof. Compressor 305 then provides the compressed air (optionally via a cooler) to pressure regulators 306-1A, 306-1B, 306-2A, 306-2B, 306-3A, 306-3B, 306-4A and 306-4B. Each one of pressure regulators 306-1A, 306-1B, 306-2A, 306-2B, 306-3A, 306-3B, 306-4A and 306-4B regulates the air pressure provided thereto to a respective pressure and provides the regulated pressurized air to the respective on of air nozzles 304-1A, 304-1B, 304-2A, 304-2B, 304-3A, 304-3B, 304-4A and 304-4B. Each one of air nozzles 304-1A, 304-1B, 304-2A, 304-2B, 304-3A, 304-3B, 304-4A and 304-4B directs a flow of air toward the outer portion of a respective one of cylinders 308-1, 308-2, 308-3 and 308-4.

In the system exemplified in conjunction with FIG. 3, pressure regulators 306-1A, 306-1B, 306-2A, 306-2B, 306-3A, 306-3B, 306-4A and 306-4B regulated the pressure provided thereto. However, it is noted that air nozzles 304-1A, 304-1B, 304-2A, 304-2B, 304-3A, 304-3B, 304-4A and 304-4B may act as the pressure regulators as well as directing a flow of air to the respective cylinder. For example, air nozzles 304-1A, 304-1B, 304-2A, 304-2B, 304-3A, 304-3B, 304-4A and 304-4B are adjustable air nozzles. Also, in the system exemplified in conjunction with FIG. 3, each cylinder was associated with two air nozzles and each air nozzle was associated with a respective pressure regulator. However, a group of air nozzles (e.g., 2, 4 or all of the air nozzles) may be associated with a single pressure regulator. Also, the pressure regulators may be controlled regulators actively controlled by a controller.

Figure 4:
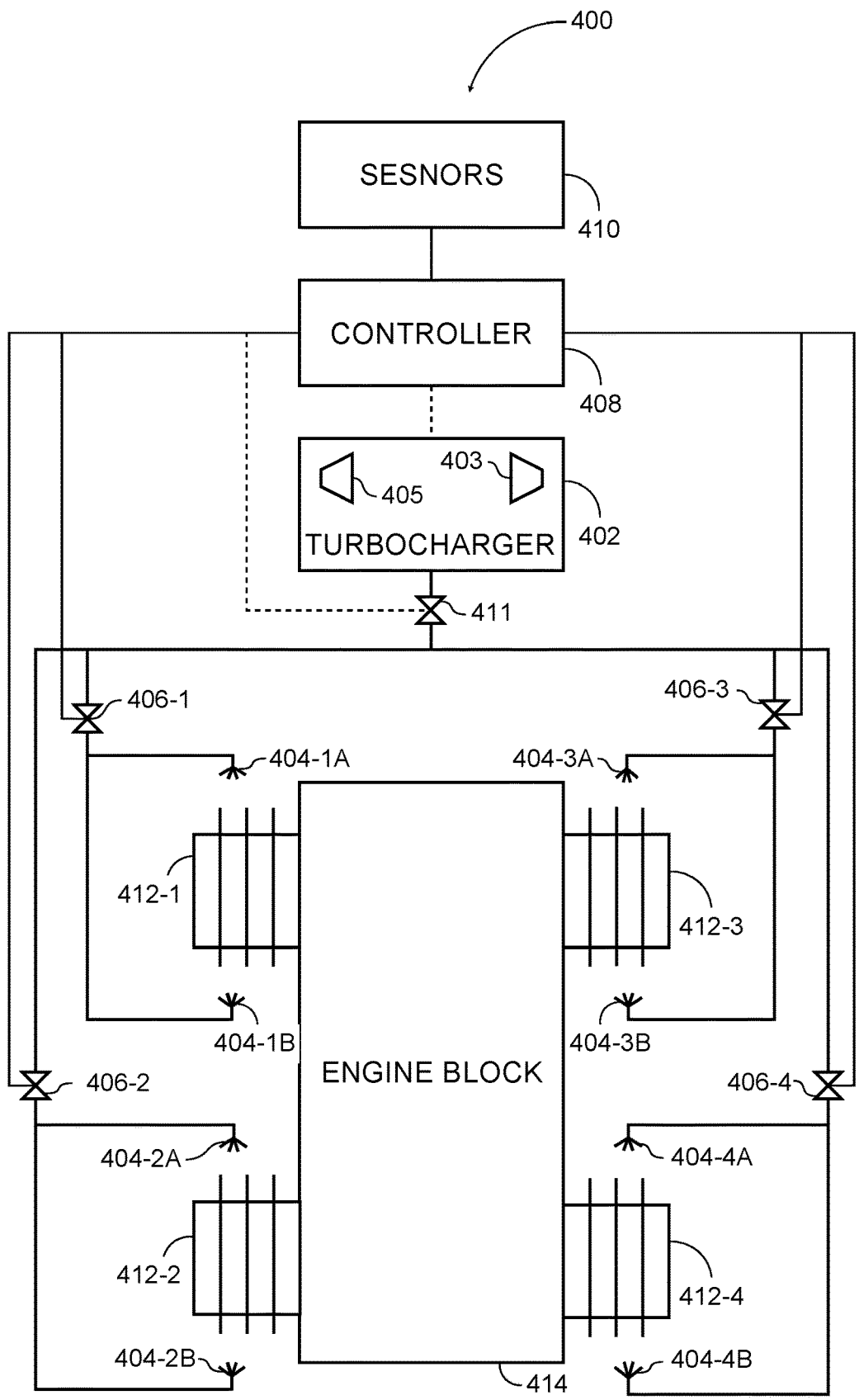
FIG. 4 is a schematic illustration of a system for controlling the temperature of an engine, constructed and operative in accordance with another embodiment of the disclosed technique.

Reference is now made to FIG. 4, which is a schematic illustration of a system, generally referenced 400, for controlling the temperature of an engine, constructed and operative in accordance with another embodiment of the disclosed technique. System 400 includes a turbocharger 402, a plurality of air nozzles 404-1A, 404-1B, 404-2A, 404-2B, 404-3A, 404-3B, 404-4A and 404-4B, and a plurality of controlled pressure regulators 406-1, 406-2, 406-3 and 406-4. System 400 further includes a controller 408 and optionally includes a sensor or sensors 410 and a master valve 411. Turbocharger 402 includes a turbine 403 and a compressor 405.

The inlet of each one of pressure regulators 406-1, 406-2, 406-3 and 406-4 is fluidically coupled with the compressed air outlet port of turbocharger 402 (i.e., via one or more ducts or pipes). The outlet of each one of pressure regulators 406-1, 406-2, 406-3 and 406-4 is fluidically coupled with respective ones of air nozzles 404-1A, 404-1B, 404-2A, 404-2B, 404-3A, 404-3B, 404-4A and 404-4B. The outlet of pressure regulators 406-1 is fluidically coupled with the inlet of air nozzles 404-1A, 404-1B. The outlet of pressure regulators 406-2 is fluidically coupled with the inlet of air nozzles 404-2A, 404-2B. The outlet of pressure regulators 406-3 is fluidically coupled with the inlet of air nozzles 404-3A, 404-3B. The outlet of pressure regulators 406-4 is fluidically coupled with the inlet of air nozzles 404-4A, 404-4B. Each one of pressure regulators 406-1, 406-2, 406-3 and 406-4 is electrically coupled with controller 408. Controller 408 is coupled (e.g., electrically or wirelessly) with sensor or sensors 410 and optionally coupled with turbocharger 402 (i.e., as indicated by the dashed line). Controller 408 is also optionally coupled with master valve 411. Sensors 410 includes one or more sensors which measure information relating to a respective engine parameter, and provide that measured information to controller 408. Such sensor or sensors are, for example, CHT sensor or sensors (i.e., for one or more of the cylinders), EGT sensor, manifold pressure sensor, engine Revolution Per Minute (RPM) sensor, ambient temperature sensor, or air nozzle air pressure sensor.

Each pair of air nozzles 404-1A, 404-1B, 404-2A, 404-2B, 404-3A, 404-3B, 404-4A and 404-4B is directed toward a respective cylinder 412-1, 412-2, 412-3 and 412-4 of engine 414. Air nozzles 404-1A and 404-1B are directed toward cylinder 412-1, air nozzles 404-2A and 404-2B are directed toward cylinder 412-2, air nozzles 404-3A and 404-3B are directed toward cylinder 412-3, and air nozzles 404-4A and 404-4B are directed toward cylinder 412-4.

Exhaust gas flows from the exhaust gas manifold of engine 414, into turbocharger 402 (similar to as described above in conjunction with FIGS. 1 and 2), and rotates turbine 403. Turbine 403 rotates compressor 405. Compressor 405 draws air and increases the pressure thereof. Compressor 405 provides the compressed air (optionally via a cooler) to pressure regulators 406-1, 406-2, 406-3 and 406-4. Each one of pressure regulators 406-1, 406-2, 406-3A and 406-4 regulates the air pressure provided thereto to a respective pressure and provides the regulated pressurized air to the respective ones of air nozzles 404-1A, 404-1B, 404-2A, 404-2B, 404-3A, 404-3B, 404-4A and 404-4B. Each one of air nozzles 404-1A, 404-1B, 404-2A, 404-2B, 404-3A, 404-3B, 404-4A and 404-4B directs a flow of air toward the outer portion of a respective one of cylinders 412-1, 412-2, 412-3 and 412-4.

Controller 408 receives measured information from sensor or sensors 410 and regulates the pressure of the air provided to each one of air nozzles 404-1A, 404-1B, 404-2A, 404-2B, 404-3A, 404-3B, 404-4A and 404-4B by controlling the respective one of pressure regulators 406-1, 406-2, 406-3 and 406-4. For example, when sensors 410 include a CHT sensor for each one of cylinders 412-1, 412-2, 412-3 and 412-4, controller 408 may detect that the temperature of cylinder 406-2 rises above a threshold. Controller 408 than regulates (e.g., increases) the air pressure provided to air nozzles 404-2A, 404-2B accordingly via pressure regulator 406-2, thereby increasing the flow of air around cylinder 406-2. According to another example, controller 408 may detect that the ambient temperature is low. Controller 408 than regulates (e.g., decreases) the air pressure provided to air nozzles 404-1A, 404-1B, 404-2A, 404-2B, 404-3A, 404-3B, 404-4A (i.e., since there is less need to cool cylinders 412-1, 412-2, 412-3 and 412-4 relative to high ambient temperature) via pressure regulators 406-1, 406-2, 406-3 and 406-4, thereby decreasing the flow of are around cylinders 412-1, 412-2, 412-3 and 412-4. As a further example, controller 408 may detect that the manifold pressure of engine 414 has dropped below a threshold. Controller 408 than regulates (e.g., reduces) the air pressure provided to air nozzles 404-2A, 404-2B accordingly via pressure regulators 406-1, 406-2, 406-3 and 406-4, thereby increasing the air pressure provided to the intake manifold.

As mentioned above, controller 408 may be coupled with turbocharger 402. Controller 408 may then control the operation of turbocharger 402. For example, controller 408 may control the wastegate valve of turbocharger 402. Thus, for example, when employing a configuration similar to as described in FIG. 2, controller 408 may close or open the wastegate valve of turbocharger 402 according to the manifold pressure of engine 414. For example, if more air is provided to air nozzles 404-1A, 404-1B, 404-2A, 404-2B, 404-3A, 404-3B, 404-4A and 404-4B due to increase in the CHTs, and as a consequence the manifold pressure drops, controller 408 may close the wastegate valve thus providing more exhaust gas to turbine 403. Turbine 403 shall, in turn, rotate faster, thus rotating compressor 405 faster, and thus increasing the output pressure from turbo charger 402.

Also, when there is no need to employ air nozzles 404-1A, 404-1B, 404-2A, 404-2B, 404-3A, 404-3B, 404-4A and 404-4 to cool engine 414 (e.g., when engine 414 operates in a cold environment) master valve 411 may be closed, preventing air from reaching air nozzles 404-1A, 404-1B, 404-2A, 404-2B, 404-3A, 404-3B, 404-4A and 404-4. Master valve 411 is, for example, electrically controlled (e.g., by switch activating a solenoid), mechanically controlled, pneumatically controlled or hydraulically controlled.

In the system exemplified in conjunction with FIG. 4, pressure regulators pressure regulators 406-1, 406-2, 406-3 and 406-4 regulated the pressure provided thereto. However, it is noted that air nozzles 404-1A, 404-1B, 404-2A, 404-2B, 404-3A, 404-3B, 404-4A and 404-4 may act as the pressure regulators as well as directing a flow of air to the respective cylinder. For example, air nozzles 404-1A, 404-1B, 404-2A, 404-2B, 404-3A, 404-3B, 404-4A and 404-4 actively controlled adjustable air nozzles.

It will be appreciated by persons skilled in the art that the disclosed technique is not limited to what has been particularly shown and described hereinabove. For example, in the embodiment described in conjunction with FIGS. 3 and 4, the nozzles themselves may act as the pressure regulators as well directing a flow of air toward the respective cylinders. Also, the nozzles may be direct at other parts of the engine (e.g., the engine block, the exhaust gas duct leading to the turbocharger or to the turbine of the turbocharger) As such, the scope of the disclosed technique is defined only by the claims, which follow.

The invention claimed is:

1. A system for controlling the temperature of an engine, said engine including at least one cylinder, said system comprising:
    a turbocharger, including exhaust gas inlet port, an exhaust gas outlet port, an air inlet port, a compressed air outlet port, a turbine and a compressor, said exhaust gas inlet port is fluidically coupled with the exhaust gas outlet of said engine, exhaust gas from said engine rotates said turbine, said turbine rotates said compressor, said compressor is configured to draw air from said air inlet port, to compress said air thereby to increase the pressure thereof, and to provide said compressed air to said compressed air outlet port; and
    at least one air nozzle, an inlet of said at least one air nozzle is fluidically coupled with said compressed air outlet port, said at least one air nozzle being directed toward an outer portion of a respective one of said at least one cylinder, and configured to direct a flow of air toward said outer portion of said respective one of said at least one cylinder.

2. The system according to claim 1, further including a cooler, fluidically coupled between said turbocharger and said at least one air nozzle,
    wherein said cooler reduces the temperature of said compressed air.

3. The system according to claim 2, wherein said cooler is one of:
    a water based cooler; and
    an air based cooler.

4. The system according to claim 1, wherein said at least one nozzle is one of:
    a plain orifice nozzle;
    a shaped orifice nozzle;
    a pressure swirl single fluid nozzle; and
    a solid cone single fluid nozzle.

5. The system according to claim 1, further including at least one pressure regulator respective of at least one of said at least one air nozzle, fluidically coupled between said respective at least one of said at least one air nozzle and compressed air outlet port.

6. The system according to claim 5, further including a controller, coupled with said at least one pressure regulator,
    wherein said controller is configured to regulate air pressure provided to said at least one air nozzles via said at least one pressure regulator.

7. The system according to claim 6, further including at least one sensor, coupled with said controller,
    wherein said sensor is configured to measure information relating to a respective engine parameter and to provide measured information relating to a respective engine parameter to said controller, wherein said controller is further configured to receive said measured information from said at least one sensor and to regulates the pressure of the air provided to each one of said at least one air nozzle by controlling a respective one of said at least one pressure regulator.

8. The system according to claim 6, wherein said controller is coupled with said turbocharger, and wherein said controller is further configured to control the operation of said turbocharger.

9. The system according to claim 1, wherein at least two nozzles are directed toward said outer portion of said at least one cylinder.

10. The system according to claim 1, further including a humidifier, coupled between said turbocharger and said at least one nozzle, wherein said humidifier is configured to introduce moisture to said compressed air.

11. The system according to claim 1, further including a humidifier, coupled with said turbocharger at said air inlet port, wherein said humidifier is configured to introduce moisture to air being input to said turbocharger.

12. The system according to claim 1, wherein said flow exhibit one of:

a cone shaped pattern;
a hollow cone shaped pattern; and
a solid stream pattern.

\* \* \* \* \*